(12) United States Patent
Joye

(10) Patent No.: US 8,744,074 B2
(45) Date of Patent: Jun. 3, 2014

(54) METHOD AND DEVICE FOR COUNTERING FAULT ATTACKS

(75) Inventor: Marc Joye, Cesson-Sevigne (FR)

(73) Assignee: Thomson Licensing, Issy les Moulineaux (FR)

(*) Notice: Subject to any disclaimer, the term of this patent is extended or adjusted under 35 U.S.C. 154(b) by 530 days.

(21) Appl. No.: 12/658,990

(22) Filed: Feb. 18, 2010

(65) Prior Publication Data
US 2010/0208887 A1 Aug. 19, 2010

(30) Foreign Application Priority Data
Feb. 19, 2009 (EP) .................................. 09305162

(51) Int. Cl.
*H04L 9/00* (2006.01)
*H04L 9/30* (2006.01)
*H04L 9/28* (2006.01)
H04L 29/06 (2006.01)
H04L 9/32 (2006.01)
H04K 1/00 (2006.01)
H04K 1/04 (2006.01)
H04K 1/06 (2006.01)

(52) U.S. Cl.
USPC .................. 380/30; 380/28; 380/29; 380/37; 380/44; 380/277; 713/151; 713/182

(58) Field of Classification Search
USPC ............ 380/28, 29, 30, 37, 44, 277; 713/151, 713/182
See application file for complete search history.

(56) References Cited

U.S. PATENT DOCUMENTS

| 4,964,164 A * | 10/1990 | Fiat .................................. 380/30 |
| 6,928,163 B1 * | 8/2005 | Matyas et al. ................... 380/30 |
| 6,965,673 B1 * | 11/2005 | Boneh et al. ..................... 380/28 |
| 7,760,872 B2 * | 7/2010 | Lipson ............................. 380/30 |
| 2002/0039420 A1 * | 4/2002 | Shacham et al. .............. 380/277 |
| 2005/0084096 A1 | 4/2005 | Joye et al. |
| 2008/0104400 A1 * | 5/2008 | Kocher et al. ................ 713/172 |
| 2008/0144814 A1 | 6/2008 | Villegas et al. |

OTHER PUBLICATIONS

Yen, Sun-Ming, et al., Hardware Fault Attack on RSA With CRT Revisited, Laboratory of Cryptography and Information Security, National Central University, Chung-Li, Taiwan 320, R.O.C, LNCS 2587, pp. 374-388, 2003. http://www.csie.ncu.edu.tw/~yensm/.
European Search Report for EP09 30 5162 dated Jul. 16, 2009.
Lenstra, "Generating RSA Moduli with a Predetermined Portion" Lecture Notes in Computer Science, No. 1514, Oct. 1, 1998, pp. 1-10.
Joye et al., "RCA Moduli with a Predetermined Portion: Techniques and Applications", Information Security Practice and Experience, Lecture Notes in Computer Science, Berlin, Heidelberg, May 7, 2007, pp. 116-130.

* cited by examiner

*Primary Examiner* — Christopher Brown
*Assistant Examiner* — Kari Schmidt
(74) *Attorney, Agent, or Firm* — Tutunjian & Bitetto, P.C.

(57) ABSTRACT

The public exponent e of an RSA key is embedded in a RSA key object that lacks this exponent. During exponentiation, the public exponent e may be extracted and used to verify that the result of the exponentiation is correct. The result is output only if this is the case. The invention counters fault-attacks. Also provided are an apparatus and a computer program product.

5 Claims, 1 Drawing Sheet

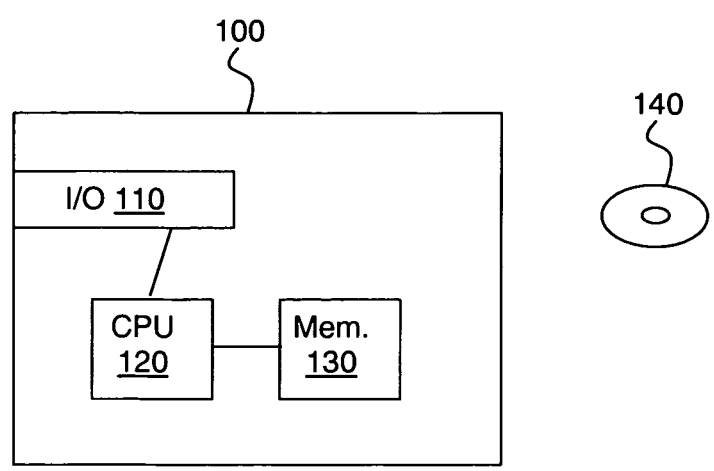

METHOD AND DEVICE FOR COUNTERING FAULT ATTACKS

This application claims the benefit, under 35 U.S.C. §119 of European Patent Application 09305162.1 filed Feb. 19, 2009.

FIELD OF THE INVENTION

The present invention relates generally to cryptography, and in particular to a fault attack countermeasure for RSA.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

A fault attack disturbs the expected behaviour of a security device and makes it work abnormally so as to infer sensitive data from the faulty output. Such attacks were introduced by Boneh et al. in "On the Importance of Checking Cryptographic Protocols for Faults"; D. Boneh, R. A. DeMillo, and R. J. Lipton; In W. Fumy, editor, Advances in Cryptology—EUROCRYPT '97, volume 1233 of Lecture Notes in Computer Science, pages 37-51, Springer-Verlag 1997.

Fault attacks can be very powerful. For example, a faulty RSA signature with a single random fault and evaluated using Chinese remaindering (CRT) can allow an attacker to recover the entire secret key from the faulty signature. It is thus clear that countermeasures must be taken.

RSA is based on the fact that it is difficult to factorize products of large primes. Let $N=pq$ be the product of two large primes. We let e and d denote a pair of matching public and private exponents, satisfying $ed \equiv 1 \pmod{\lambda(N)}$, with gcd $(e, \lambda(N))=1$ and $\lambda$ being Carmichael's function. As $N=pq$, we have $\lambda(N)=\mathrm{lcm}(p-1, q-1)$. Given $x<N$, the public operation (e.g., message encryption or signature verification) consists in raising x to the e-th power modulo N, i.e., in computing $y=x^e \bmod N$. Then, given y, the corresponding private operation (e.g., decryption of a ciphertext or signature generation) consists in computing $y^d \bmod N$. From the definition of e and d, we obviously have that $y^d \equiv x \pmod{N}$. The private operation can be carried out at higher speed through Chinese remaindering (CRT mode). Computations are independently performed modulo p and q and then recombined. In this case, private parameters are $\{p, q, d_p, d_q, i_q\}$ with $d_p=d \bmod (p-1)$, $d_q=d \bmod (q-1)$, and $i_q=q^{-1} \bmod p$. We then obtain $y^d \bmod N$ as $\mathrm{CRT}(x_p, x_q)=x_q+q[i_q(x_p-x_q) \bmod p]$, where $x_p=y^{d_p} \bmod p$ and $x_q=y^{d_q} \bmod q$.

Naturally, several such countermeasures have been proposed. The initial countermeasure by Shamir is disclosed in U.S. Pat. No. 5,991,415, initially presented at the Rump Session of EUROCRYPT '97. Somewhat simplified, this method introduces a random value j and calculates using $(\bmod\ j*p)$ instead of $(\bmod\ p)$ and verifies that the expected value is arrived at; as a given example, if j is 32 bits long, the chance of the two values matching after a fault is $2^{-32}=1/4,294,967,296$, so the risk is very slight. More specifically, the values of $x'_p=y^d \bmod j*p$ and $x_j=y^d \bmod j$ are first calculated. It is verified that $x'_p \equiv x_j \pmod{j}$ and if so, the calculation is assumed to be error-free. The result of the exponentiation modulo p is then given by $x_p=x'_p \bmod p$. This same is done modulo q. The correctness of the countermeasure relies on the observation that $x \bmod p=(x \bmod j*p) \bmod p$ for any positive integer j.

Another method, mentioned by Kaliski and Robshaw in ftp://ftp.rsasecurity.com/pub/pdfs/bulletn5.pdf, consists in performing the exponentiation in a usual manner to obtain $x=y^d \bmod N$, but, before issuing x, checking it is correct by checking that $x^e$ is equal to y modulo N.

All subsequent methods basically rely on the method proposed by Shamir. These methods include:

- M. Joye, P. Paillier, and S-M. Yen. Secure Evaluation of Modular Functions. In R. J. Hwang and C. K. Wu, editors, 2001 International Workshop of Cryptology and Network Security, pages 227-229, Taipei, Taiwan, 2001.
- C. Aumüler, P. Bier, W. Fischer, P. Hofreiter, and J-P. Seifert. Fault Attack on RSA with CRT: Concrete Results and Practical Countermeasures. In B. S. Kaliski Jr., Ç. K. Koç and C. Paar, editors, Cryptographic Hardware and Embedded Systems—CHES 2002, volume 2523 of Lecture Notes in Computer Science, pages 260-275, Springer, 2002.
- J. Blömer, M. Otto, and J-P. Seifert. A New CRT-RSA Algorithm Secure Against Bellcore Attack. In $10^{th}$ ACM Conference on Computer and Communication Security (CCS 2003), pages 311-320, ACM Press, 2003.
- M. Ciet and M. Joye. Practical Fault Countermeasures for Chinese Remaindering Based RSA. In $2^{nd}$ Workshop Fault Diagnosis and Tolerance in Cryptography—FDTC 2005), pages 124-132, 2005.
- C. H. Kim and J.-J. Quisquater. How Can We Overcome Both Side Channel Analysis and Fault Attacks on RSA-CRT? In $4^{th}$ Workshop on Fault Diagnosis and Tolerance in Cryptography—FDTC 2007, pages 21-29, IEEE Computer Society Press, 2007.

Of these, it has been shown that the methods of Blömer et al. and Ciet et al. do not offer full tamper-resistance. Furthermore, none of these methods guarantee a 100% detection of faults, and they all impact performance (running time and memory requirements) and, in some cases, the personalization process.

It will therefore be appreciated that there is a need for a countermeasure against fault attacks on RSA that detects all faults. This invention provides such a solution.

SUMMARY OF THE INVENTION

In a first aspect, the invention is directed to a method for calculating an exponentiation. The method is resistant against fault-attacks. A RSA private key object being associated with a matching public exponent is obtained. A result of an exponentiation using the RSA private key object is obtained. It is verified, using the matching public exponent, that the result of the exponentiation is correct. In standard mode, the RSA private key object comprises the RSA modulus N and the matching public exponent e is obtained from the RSA modulus N; in CRT mode, the RSA private key object comprises the factors of the RSA modulus N, and the matching public exponent e is obtained from the at least one of the factors of the RSA modulus N.

In a first preferred embodiment, the matching public exponent e is comprised in the leading bits of the binary representation of RSA modulus N.

In a second preferred embodiment, in CRT mode, the matching public exponent e is comprised in the leading bits of the binary representation of RSA modulus N, the RSA modulus N being obtained by multiplication of its factors.

In a second aspect, the invention is directed to a device for calculating an exponentiation, the device being resistant against fault-attacks. The device comprises means for obtaining a RSA private key object, the RSA private key object being associated with a matching public exponent; means for obtaining a result of an exponentiation using the RSA private key object; and means for verifying, using the matching public exponent, that the result of the exponentiation is correct. The device further comprises means for obtaining the matching public exponent e: in standard mode, from a RSA modulus N comprised in the RSA private key object; and in CRT mode, from the at least one of factors of the RSA modulus N, the factors of the RSA modulus N being comprised in the RSA private key object.

In a first preferred embodiment, the means for obtaining a RSA private key object, the means for obtaining a result of an exponentiation using the RSA private key object, the means for verifying, using the matching public exponent, that the result of the exponentiation is correct, and the means for obtaining the matching public exponent e are implemented in at least one processor.

In a third aspect, the invention is directed to a computer program product having stored thereon instructions that, when executed by a processor, performs the method of the first aspect.

BRIEF DESCRIPTION OF THE DRAWINGS

Preferred features of the present invention will now be described, by way of non-limiting example, with reference to the accompanying drawings, in which:

FIG. 1 illustrates a device according to a preferred embodiment of the present invention.

PREFERRED EMBODIMENT OF THE INVENTION

There is a difference between "key" and "key object" in RSA. A key is an entity such as a public key (N,e) or a private key (N,d) (respectively (p, q, $d_p$, $d_q$, $i_q$) in CRT mode) that may be used for cryptographic calculations, while a key object may be said to be a representation of a key.

In existing Application Programming Interfaces (APIs), such as for example that provided by JavaCards, a RSA private key object is initialized from $\{p,q,d_p,d_q,i_q\}$ in CRT mode and from $\{N,d\}$ in standard mode.

It is worth noting that the corresponding public exponent e is not available. Because of this, many proposed countermeasures, already mentioned herein, check whether or not the computation y:=$x^d$ mod N is error-free. However, if the value of e were available, it would be easy to check the correctness of y by verifying if $y^e \equiv x$ (mod N) in standard mode or if $y^e \equiv x$ (mod $\{p,q\}$) in CRT mode. This is especially true as the value of e is almost always chosen small, typically 3 or $2^{16}+1$.

In order to allow this, in the preferred embodiment the value of e is made available by embedding its value in the RSA private key object.

Contrary to the prior art solution, this can enable detection of all errors.

A main inventive idea is thus to embed a representation of the public RSA exponent e in the RSA key. By "representation" is meant a way of unambiguously denoting value. For example, commonly used public RSA exponents are 3 and $2^{16}+1$. Examples of representations of these values are their binary values, their length in bytes followed by their values, or indeed "1" for 3 and "2" for $2^{16}+1$ if this has been agreed upon beforehand.

As mentioned, such a key object is obtained from $\{p,q,d_p, d_q,i_q\}$ in CRT mode and from $\{N,d\}$ in standard mode. When computing y=$x^d$ mod N, it is checked whether the public exponent e is embedded in the representation of the RSA key. If this is the case, the public exponent e is recovered. Then it is verified if $y^e \equiv x$ (mod N) in standard mode or if $y^e \equiv x$ (mod $\{p,q\}$) in CRT mode. Only upon successful verification is y returned.

The skilled person will appreciate that a RSA modulus appears as a random string of bits. It is thus preferable to allow an application to distinguish between "regular" RSA moduli, i.e. moduli that do not embed the public exponent e, and moduli according to the present invention. To do this, it is preferable to insert an indicator S of, for instance, 64 bits, such as for example "5A5A5A5A5A5A5A5A" before (or indeed after) public exponent e, which preferably is inserted in L/V (length-value) format, where L denotes the length (e.g. in words or bits) of the value V of the public exponent e.

Given the public exponent e and a length l, a l-bit RSA modulus N=pq may be generated with a predetermined portion comprising S, L, and V. Such a modulus may be generated by any suitable method, such as the ones described in "M. Joye, RSA Moduli With a Predetermined Portion: Techniques and Applications. In Information Security Practice and Experience (ISPEC 2008), vol. 4991 of Lecture Notes in Computer Science, pages 116-130, Springer, 2008" and "A. Lenstra. Generating RSA Moduli With a Predetermined Portion. In Advances in Cryptology—ASIACRYPT '98, vol. 1514 of Lecture Notes in Computer Science, pages 1-10, Springer, 1998.

From such a modulus N, it is easy to recover the value of the public exponent e. Correspondingly, in CRT mode, the value of the public exponent e is recovered from the product pq where p and q denote the private factors of N.

In other words, in order to calculate an exponentiation, the RSA private key object is obtained, either by e.g. extracting the private key object from one or more stored data fields, by calculation from values in one or more stored data fields, or by a combination thereof. The RSA private key object is associated with a matching public exponent, which is to say that there exists a corresponding public exponent that for example can be used for verification of exponentiations and signatures. The result of an exponentiation using the RSA private key object—e.g. y:=$x^d$ mod N—is obtained, for example by calculation or by receiving it from a further device. It is then verified, using the matching public exponent, that the result of the exponentiation is correct, for example by checking that $y^e \equiv x$ (mod N). Depending on the implementation, the matching public exponent e is obtained in different ways. In standard mode, it is obtained from the RSA modulus N and in CRT mode it is obtained from the at least one of the factors of the RSA modulus N. 'Obtained' means extracting the public exponent e which is embedded in a further entity. For example in standard mode, the public exponent e may be formed a series of binary digits in the binary representation of N; and in the CRT mode, the public exponent e may be formed a series of binary digits in the binary representation of p or q, or even in the product of p and q. In the latter case, the product has to be calculated before the e can be extracted.

FIG. 1 illustrates a device according to a preferred embodiment of the present invention. The device 100 comprises at least one interface unit 110 adapted for communication with other devices (not shown), at least one processor 120 and at least one memory 130 adapted for storing data, such as intermediary calculation results. The processor 120 is adapted to extract an embedded public exponent e from a RSA private key object, calculate an exponentiation, and verify the result using the public exponent e, as previously described herein. A computer program product 140 such as a CD-ROM or a DVD comprises stored instructions that, when executed by the processor 120, performs the method according to any of the embodiments of the invention.

It will be appreciated that the present invention enables detection of all faults or errors. It will also be appreciated that the present invention is fully compatible with existing implementations, so there is no need to change the APIs. Finally, a further advantage is that the method of the invention is very efficient; typically, it only requires a few additional modular multiplications, so the verification step for a typical 2048-bit application only represents about 0.09% to 0.5% of the overall calculations.

Each feature disclosed in the description and (where appropriate) the claims and drawings may be provided independently or in any appropriate combination.

Features described as being implemented in hardware may also be implemented in software, and vice versa. Connections may, where applicable, be implemented as wireless connections or wired, not necessarily direct or dedicated, connections.

Reference signs appearing in the claims are by way of illustration only and shall have no limiting effect on the scope of the claims.

The invention claimed is:

1. A method for calculating an exponentiation, the method being resistant against fault-attacks and comprising the steps, in a device, of:
    obtaining a RSA private key object, the RSA private key object being associated with a matching public exponent;
    obtaining a result of an exponentiation using the RSA private key object;
    obtaining the matching public exponent; and
    verifying, using the matching public exponent, that the result of the exponentiation is correct;
    wherein, in standard mode: the RSA private key object comprises the RSA modulus N, the matching public exponent e being obtained by extraction from the RSA modulus N in which it is embedded; and
    wherein, in CRT mode: the RSA private key object comprises the factors of the RSA modulus N, the matching public exponent e being obtained by extraction from one of the factors of the RSA modulus N or from a product of the factors of the RSA modulus N.

2. The method of claim 1, wherein the matching public exponent e is comprised in the leading bits of the binary representation of RSA modulus N.

3. The method of claim 2, wherein, in CRT mode, the RSA modulus N is obtained by multiplication of its factors.

4. A device for calculating an exponentiation, the device being resistant against fault-attacks and comprising a processor configured to:
    obtain a RSA private key object, the RSA private key object being associated with a matching public exponent;
    obtain a result of an exponentiation using the RSA private key object;
    verify, using the matching public exponent, that the result of the exponentiation is correct; and
    obtain the matching public exponent e:
    in standard mode, from a RSA modulus N comprised in the RSA private key object; and
    in CRT mode, from the at least one of factors of the RSA modulus N, the factors of the RSA modulus N being comprised in the RSA private key object.

5. A non-transitory computer readable medium having stored thereon instructions that, when executed by a processor, performs the steps of:
    obtaining a RSA private key object, the RSA private key object being associated with a matching public exponent;
    obtaining a result of an exponentiation using the RSA private key object;
    obtaining the matching public exponent; and
    verifying, using the matching public exponent, that the result of the exponentiation is correct;
    wherein, in standard mode: the RSA private key object comprises the RSA modulus N, the matching public exponent e being obtained by extraction from the RSA modulus N in which it is embedded; and
    wherein, in CRT mode: the RSA private key object comprises the factors of the RSA modulus N, the matching public exponent e being obtained by extraction from one of the factors of the RSA modulus N or from a product of the factors of the RSA modulus N.

* * * * *